US010244098B2

United States Patent
Muthukumar (10) Patent No.: US 10,244,098 B2
(45) Date of Patent: Mar. 26, 2019

(54) AUTONOMOUS MOBILITY, ORIENTATION AND ROTATION PROVIDING MECHANISM FOR MOBILE DEVICES [AMORPM]

(71) Applicant: Prasad Muthukumar, Tamil Nadu (IN)

(72) Inventor: Prasad Muthukumar, Tamil Nadu (IN)

(73) Assignee: Prasad Muthukumar, Salem, Tamilnadu (IN)

( * ) Notice: Subject to any disclaimer, the term of this patent is extended or adjusted under 35 U.S.C. 154(b) by 0 days.

(21) Appl. No.: 15/545,685

(22) PCT Filed: Jan. 25, 2016

(86) PCT No.: PCT/IN2016/000026
§ 371 (c)(1),
(2) Date: Jul. 22, 2017

(87) PCT Pub. No.: WO2016/120887
PCT Pub. Date: Aug. 4, 2016

(65) Prior Publication Data
US 2018/0124230 A1    May 3, 2018

(30) Foreign Application Priority Data
Jan. 27, 2015    (IN) .............................. 376/CHE/2015

(51) Int. Cl.
*H04M 1/02*        (2006.01)
*G06F 1/16*        (2006.01)
*H04M 1/725*       (2006.01)

(52) U.S. Cl.
CPC ........ *H04M 1/72569* (2013.01); *G06F 1/166* (2013.01); *G06F 1/1626* (2013.01);
(Continued)

(58) Field of Classification Search
CPC ..... H01Q 3/00; H04M 1/72519; H04W 24/02
See application file for complete search history.

(56) References Cited

U.S. PATENT DOCUMENTS

| 2005/0219228 A1* | 10/2005 | Alameh ................ G06F 1/1626 345/173 |
| 2010/0304795 A1* | 12/2010 | Laine ..................... F16M 13/00 455/575.1 |
| 2014/0135058 A1* | 5/2014 | Sanchez ................ H04W 88/02 455/550.1 |

* cited by examiner

*Primary Examiner* — Simon Nguyen
(74) *Attorney, Agent, or Firm* — Prasad Muthukumar

(57) ABSTRACT

Autonomous Mobility, Orientation and Rotation Providing Mechanism for Mobile Devices (AMORPM) provides enhanced environmental exposure for mobile device in sensing, reacting, alerting and proactively interacting with environmental users and objects according to scenarios and critical situations. AMORPM comprise of sensor system for sensing the environment is all possible direction with operating modes and usage scenarios. Processing unit computes the control signal for AMORPM mechanism by comparing the sensor system parameters with correlation table parameters in a active adaptive closed loop manner. Correlation table parameters are designed based on predetermined and tested real world scenarios with the actual real world scenarios and parameters and are utilized to compare and compute the control signal. The AMORPM mechanism utilizes an automatically retractable motorized section telescopic legs that acts according to the control signal from the processing unit to change the mobility, orientation, rotation and footing for the optimized operation and user interaction of the mobile devices. Other aspect of AMORPM provides optimum position, orientation, rotation and footing for optimum wireless energy transfer.

11 Claims, 9 Drawing Sheets

(52) U.S. Cl.
CPC .......... *G06F 1/1684* (2013.01); *G06F 1/1686* (2013.01); *G06F 1/1694* (2013.01); *H04M 1/0202* (2013.01); *H04M 2250/12* (2013.01); *H04M 2250/52* (2013.01); *Y02D 70/00* (2018.01); *Y02D 70/142* (2018.01); *Y02D 70/144* (2018.01); *Y02D 70/164* (2018.01); *Y02D 70/26* (2018.01)

FIGURE. 2

Automatically Retractable Motorised Section Telescopic Legs on the centre of four sides of base or rear side mobile

Motor for Automatically Retractable Section Telescopic Leg

FIGURE. 3

Autonomous Circular and Oval orientation changing motorised base mechanism on the base or rear side mobile

FIGURE. 4

FISHEYE LENS CAMERA INTEGRATION WITH USERS AND ENVIRONMENTAL IMAGES

FIGURE. 5

360 DEGREE COVERAGE OF CORNER AND SIDE CAMERAS

FLOW CHART:

FIGURE. 8

VARIOUS MODELS OF MOBILE DEVICE AND ITS HANDLING POSITION

MOBILE DEVICE          ORIENTATION

FIGURE. 9

MODEL OF ENVIRONMENT SENSING SENSOR SYSTEM SENSING PROPERTY OF ENVIRONMENT AND USER

AUTONOMOUS MOBILITY, ORIENTATION AND ROTATION PROVIDING MECHANISM FOR MOBILE DEVICES [AMORPM]

FILED OF INVENTION

AMORPM is related to mobile devices and more particularly to a mechanism with automatically retractable motorised section telescopic legs that provides autonomous mobility and orientation for the mobile devices thereby to provides enhanced environmental exposure for mobile device through sensing, reacting, alerting and proactively interacting with environmental users and objects according to scenarios and critical situations

BACKGROUND

Smart phone are not really smart as it lacks users, environmental and context awareness, lacks autonomous—mobility, orientation and rotation to sense the environment in all possible direction and accordingly proactively alert and interact with the environmental users, objects, scenarios and critical situations. With the existing market designs users have to be watchful and check their mobile devices every time for the missed parameters. Missed—Calls, messages, mails, calendar could be a missed opportunity. Also users are forced to take the wireless mobile device to check missed or unattended parameters. As the present alerting systems lacks user and environmental awareness, when the wireless mobile device alerts the user regarding important or critical calls, messages, mails, schedule task, calendar, meeting and if the user is not available generally the application will stop alerting in a particular time (which works irrespective of user presence), where as in these scenarios due to the unavailability of a proactive interface, the users are made to wait till they pick up their mobile to check for missed parameters even though the users are back and available in the wireless mobile device environment. So even when the user is available or within the scope of the wireless mobile device, the wireless mobile device won't alert the user regarding the unattended parameters which sometimes could lead to loss of users valuable time in critical situations. Limitations with the best alerting system currently available in market—Smart Alert—which only alerts when the wireless mobile device is picked up by vibrating. But when the user is back it is not a must and we cannot expect the user to pick up the wireless mobile devices and user might be available near the wireless mobile device and focusing on others. Missed—Calls, messages, mails, calendar could be a Missed Opportunity. With the existing designs in the market users have to be watchful and check their mobile devices every time for the missed parameters. Users are forced to take the wireless mobile device to check missed or unattended parameters.

Dependency on wearable computing devices—It is highly difficult to wear a computing devices all the time [day and night] to keep updated and also this could affect the comfort level of users. Also due to limited battery resource on wearable computing devices users are forced to recharge and maintain battery which in turn increases the burden in device maintenance. So users are forced to depend on wearable computing devices to keep them updated. Blind Interaction I Lack of context awareness and real personalization with present Voice interaction and intelligent personal assistant systems. Users differ with varying expectations and requirement I But persistently addressing all the users commonly doesn't always makes sense. None of the Voice interaction and intelligent personal assistant systems for mobile devices works by looking at the user's face. Also they don't have a feature to real personalized user interaction which makes more sense instead of blindly interacting with the any user in the same way.

Problem Statement

Issues with the present design
Presently mobile devices lacks autonomous mobility, rotation and orientation.
Presently smart phones lacks user and environmental awareness
Missed—Calls, messages, mails, calendar could be a missed opportunity
Loss of user's valuable time in critical situations
Users have to be watchful and check their mobile devices every time for the missed parameters
Users are forced to take the wireless mobile device to check missed or unattended parameters.
Dependency on wearable computing devices
Blind Interaction I Lack of real personalization, lack of environment and context awareness.
Users differ with varying expectations and requirement I But persistently addressing all the users commonly doesn't always makes sense.

SUMMARY

To address the issues with existing design and to provide enhance environmental exposure regarding users and objects, the AMORPM provides a smart active environment sensing and interactive approach through autonomous mobility, orientation and direction that works mainly based on sensing the change in mobile device users and environments—property, dimension, direction, distance, position and mobile device orientation thereby smart and actively interact with users according to scenarios. The main advantage of the AMORPM is that AMORPM predominantly utilises the already existing components of the wireless mobile device with little more sophistication and coding thereby making implementation easy and substantially reducing the implementation cost. With the property sensing capability the AMORPM can more precisely sense the user & other vicinity environment [in addition to usage scenarios] with their direction and position with respect to mobile device in real time usage scenarios to achieve an optimised solution in user interaction. Also AMORPM act according to parameters, scenarios and configuration to optimise user interaction comprising speaker mode, head set or hands free, download or data transfer mode.

The AMORPM mechanism utilizes a motorised section telescopic legs comprising automatically retractable legs, automatically retractable telescopic legs, automatically retractable section telescopic legs, automatically kick stand, vibrator, driving mechanism, smooth and sticky foot, variable foot mechanism all to provide the mobility, orientation and footing for the mobile devices.

According to one aspect, the AMORPM mechanism utilizes a motorised section telescopic legs that acts according to the control signal from the processing unit to provide autonomous mobility, orientation, rotation or direction for mobile devices.

According to another aspect, the AMORPM mechanism utilises fisheye lens for sensing the environmental users and objects in 360 degree and all possible directions, feasibility of space for mobility, orientation and rotation thereby interact according to scenarios.

According to another aspect of AMORPM mechanism utilises side and corner cameras are utilised to sense the environmental users and objects in 360 degree and all possible directions, feasibility of space for mobility, orientation and rotation thereby interact according to scenarios.

According to another aspect of AMORPM mechanism the sensor system sense the change in nature or property [permittivity-ε, permeability-μ, conductivity-σ, susceptibility, dielectric, organic, inorganic] of mobile device vicinity or proximity environment or platform, sensing environments direction, dimension, range, multi layers & position with respect to mobile device, sensing user [head, body & hand hold effects], mobile device orientation, effect of environment, feasibility of space for mobility, orientation and rotation to accordingly optimise the user interaction.

According to another aspect of AMORPM mechanism one or more sensors or cameras either visual or infrared/thermo-graphic or combination of both and range sensors are optimally placed in the wireless mobile device on and around the wireless mobile device based on design for sensing the vicinity environment, detecting human presence, face & body recognition, computing distance or range of user & environment are all compared with predetermined & tested correlation table parameters in active, adoptive and closed loop manner for precisely sensing the environment thereby to compute the feasibility and optimum position, orientation and direction to proactive interact with the users.

According to another aspect of the AMORPM mechanism to further enhance the efficiency of AMORPM orientation sensors comprising gyro sensor, accelerometer, E-compass or magnetometer, inclinometer and similar sensors [multi axis sensors] are utilised to actively sense the change in mobile device orientation, feasibility of space for mobility, orientation and rotation to optimise the user interaction.

According to another aspect of the AMORPM mechanism utilise correlation tables or field mapping tables or threshold level tables which are the comparison tables to actively check and compares sensor system parameters between predetermined and tested real world scenarios to the actual real world scenarios with which AMORPM mechanism computes the feasibility of space for mobility, orientation and rotation actively to optimise the user interaction.

BRIEF DESCRIPTION OF THE DIAGRAM

To get a comprehensive understanding of the system, diagrams are described by examples.

DETAIL DESCRIPTION

Figure 1:
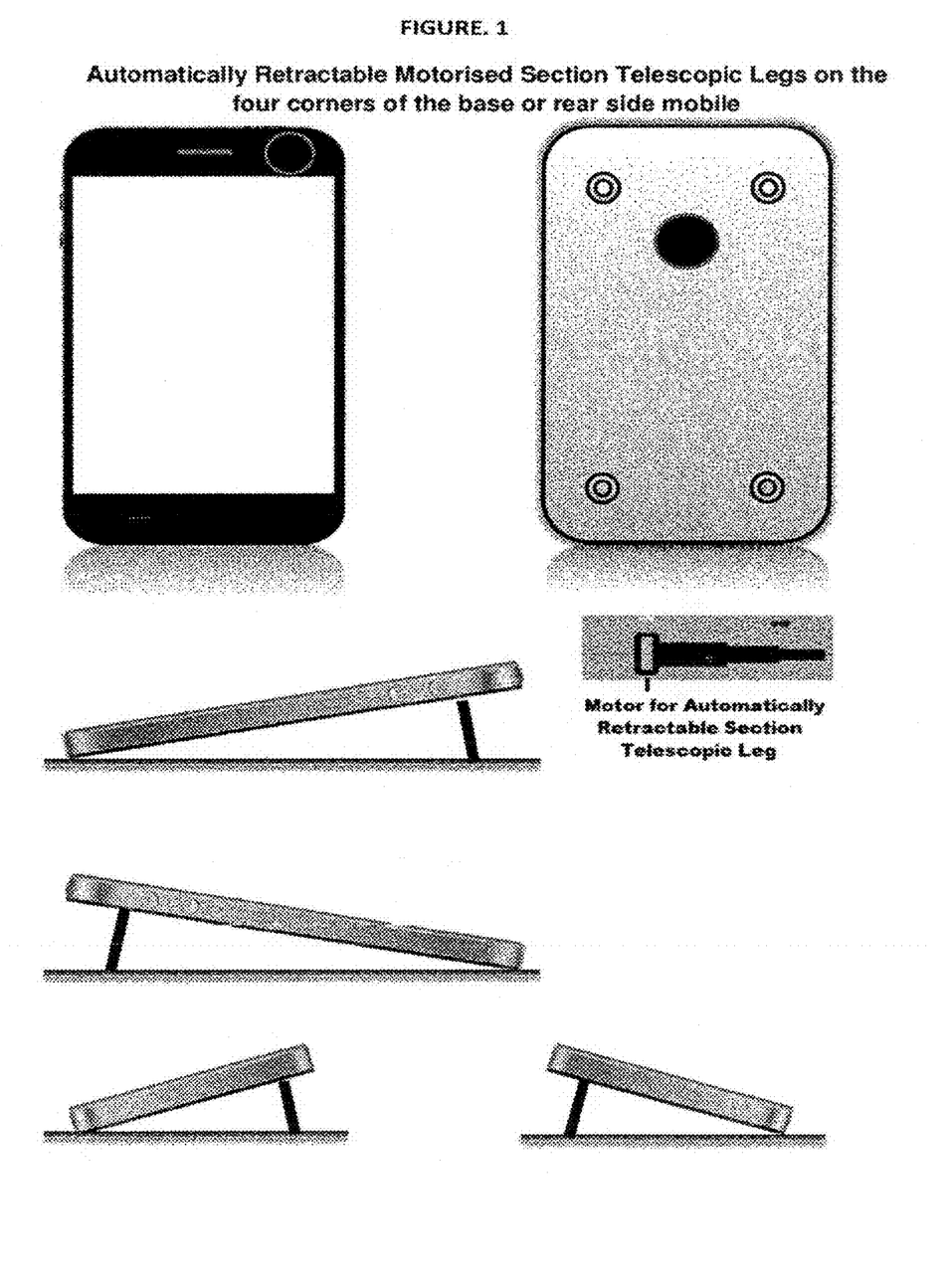
FIG. 1 illustrates the automatically retractable motorised section telescopic legs on the four corners of the base or rear side mobile
Figure 2:
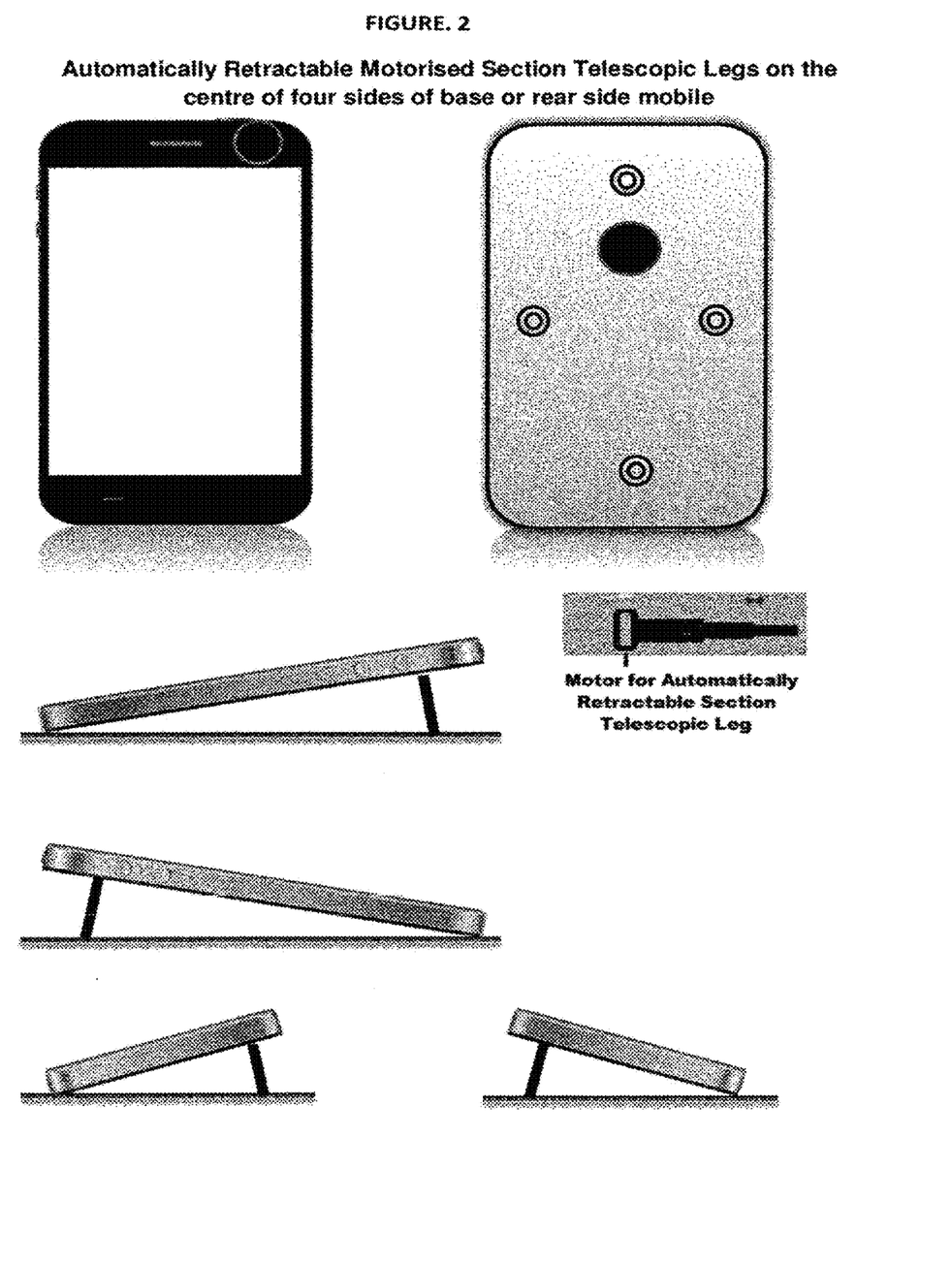
FIG. 2 illustrates the automatically retractable motorised section telescopic legs on the centre of four sides of base or rear side mobile
Figure 3:
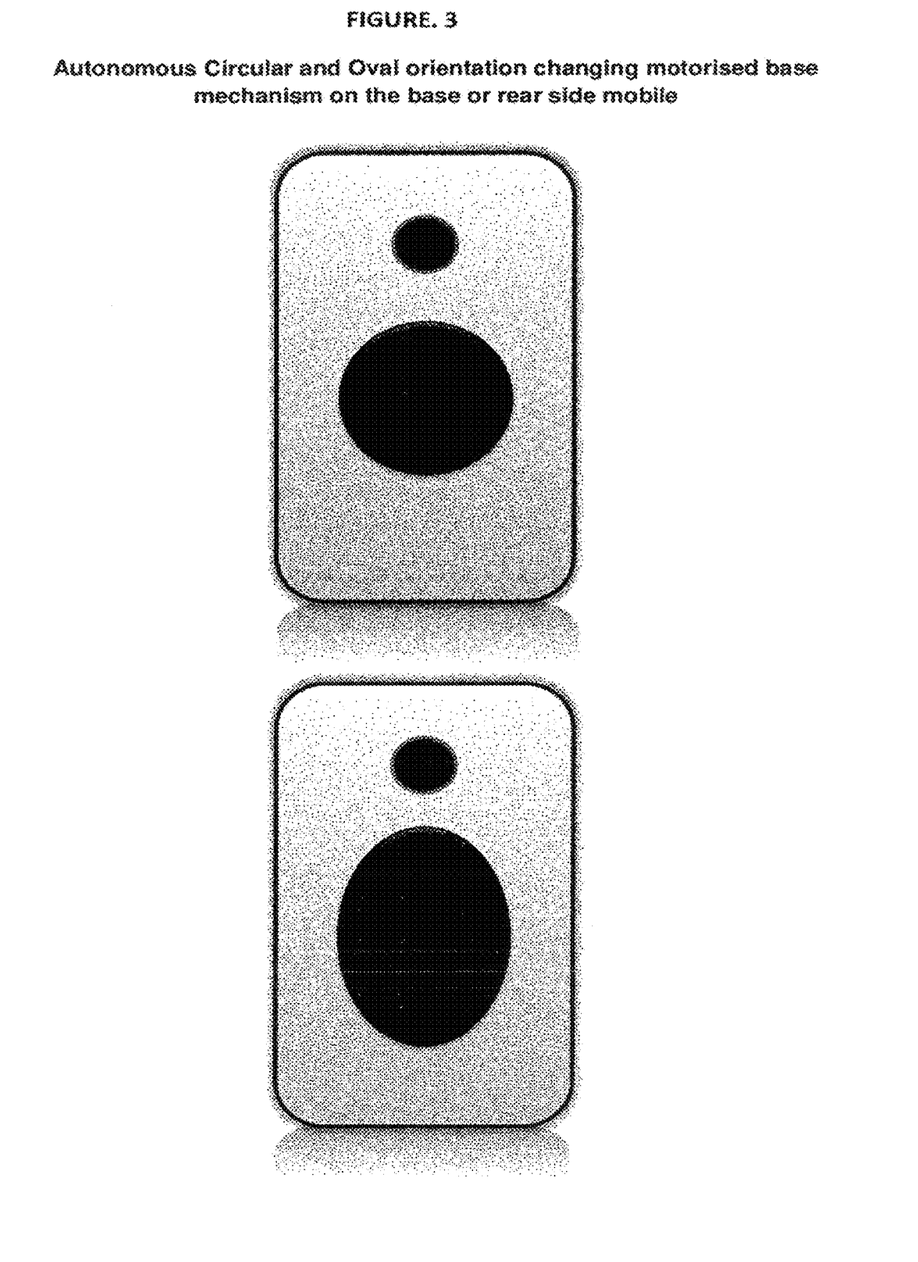
FIG. 3 illustrates the motorised autonomous Circular and Oval orientation changing base mechanism on the base or rear side mobile.
Figure 4:
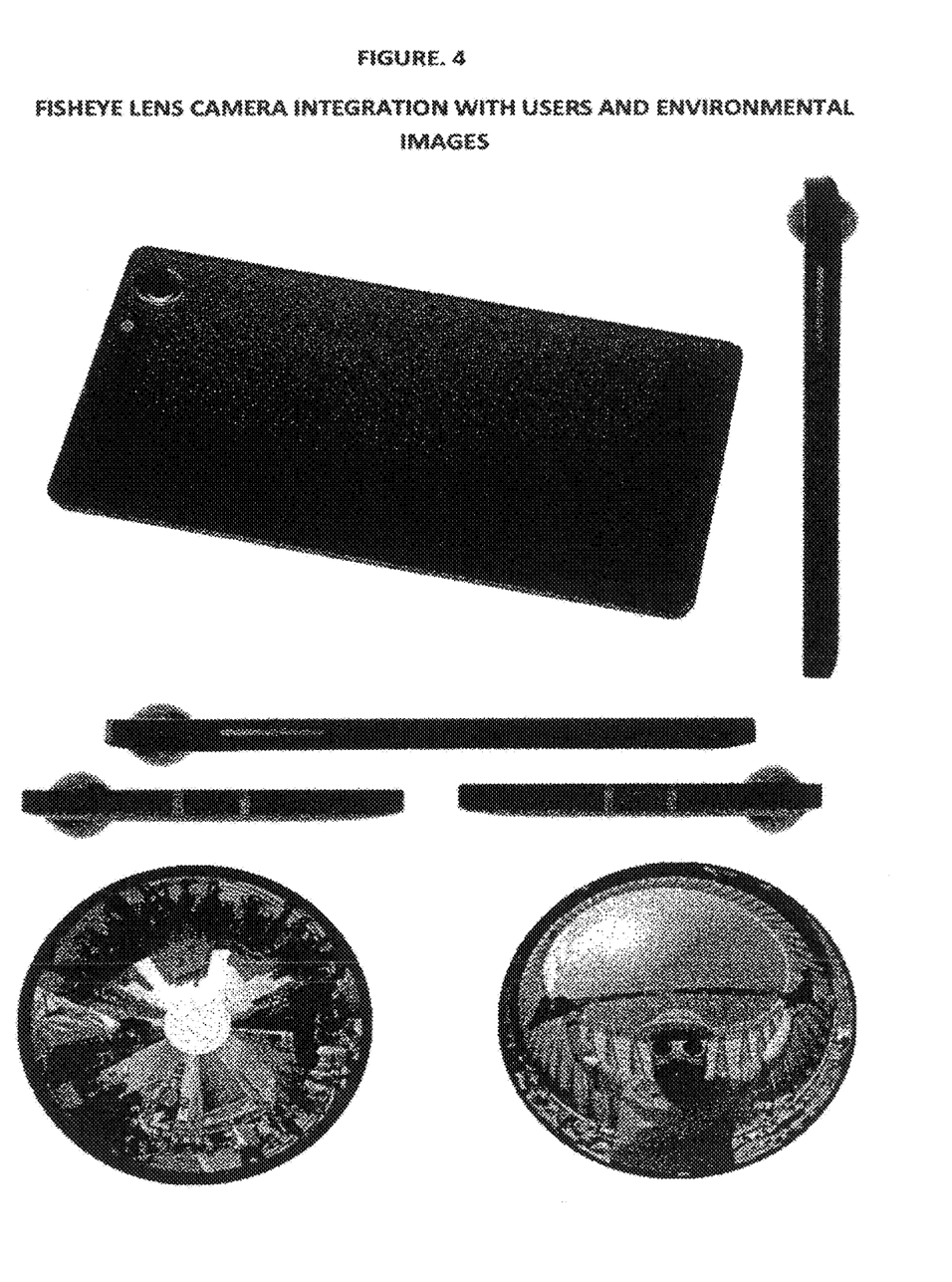
FIG. 4 illustrates the fish eye lens camera integration on mobile device with user and environmental images.
Figure 5:
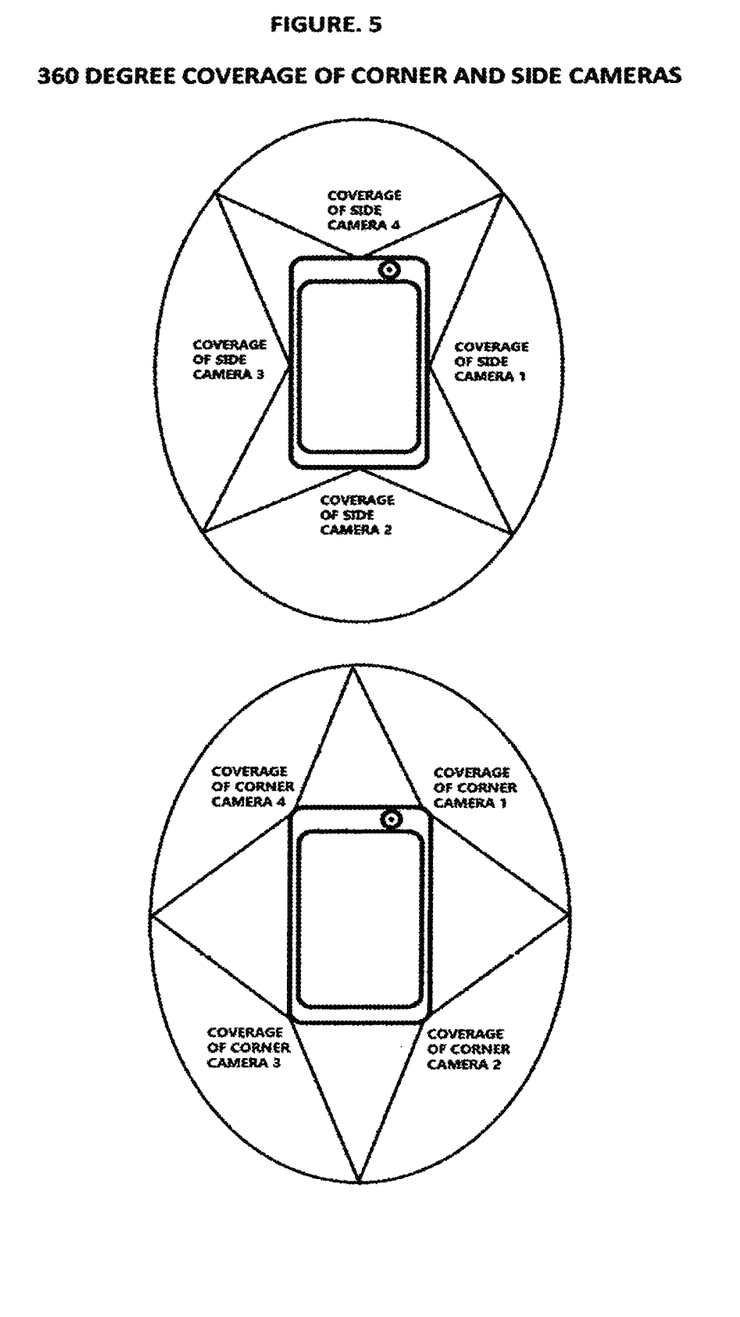
FIG. 5 illustrates the 360 degree coverage of side and corner cameras.
Figure 6:
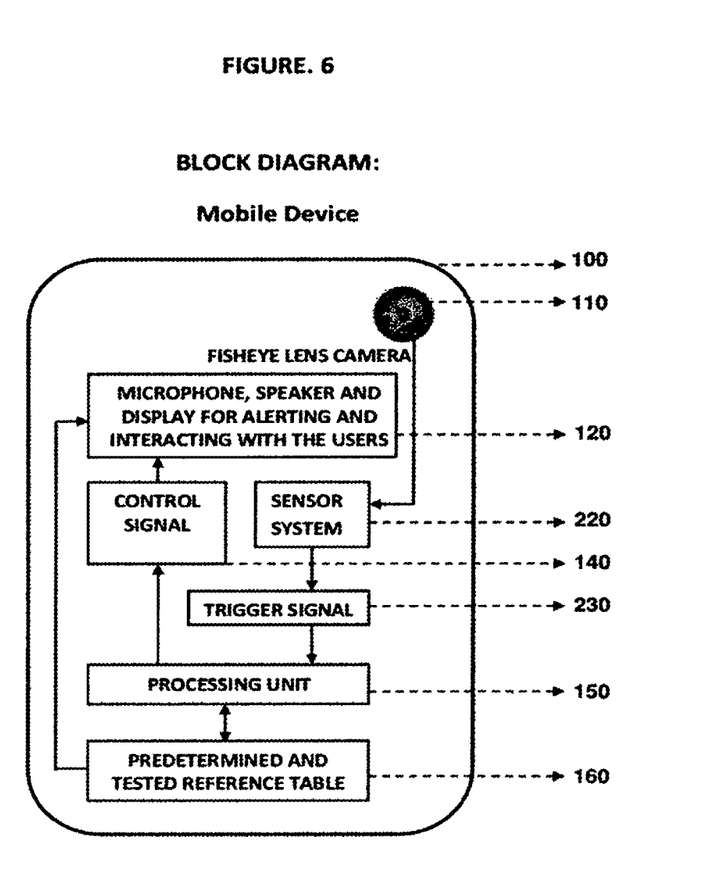
FIG. 6 illustrates the block diagram of portable mobile device with components of AMORPM.
Figure 7:
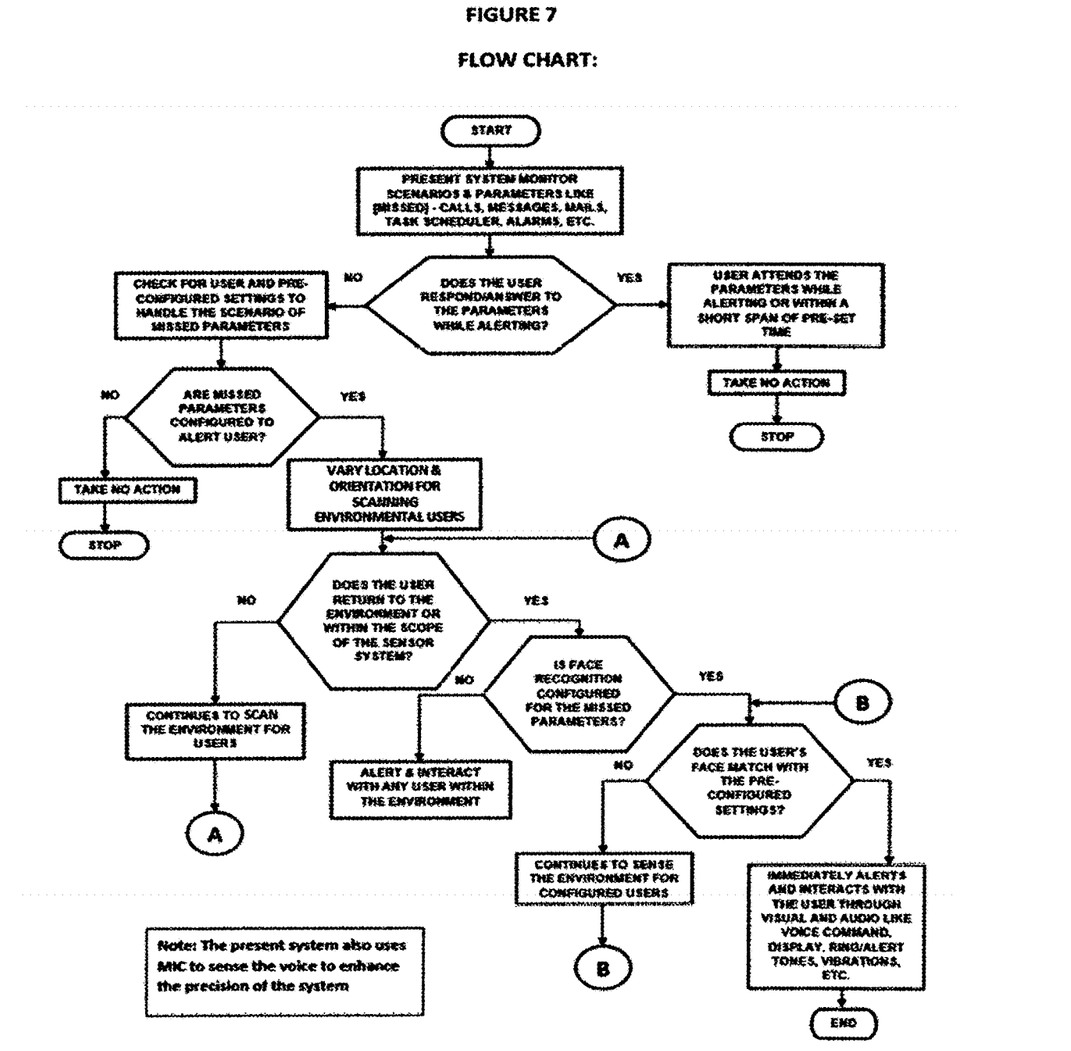
FIG. 7 illustrates the flowchart and describes the method of operation of the AMORPM.
Figure 8:
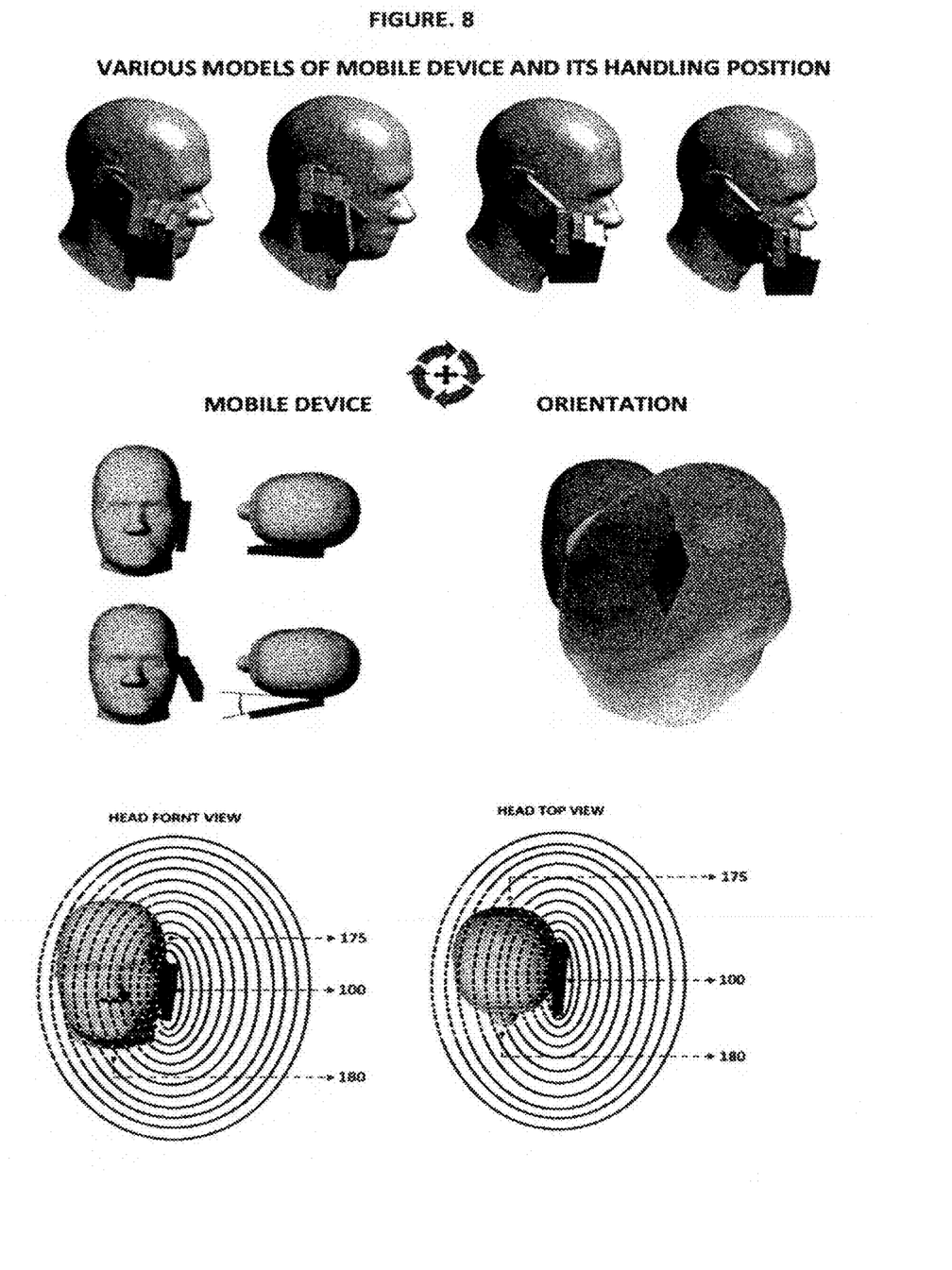
FIG. 8 illustrates various models of mobile devices and its handling positions
Figure 9:
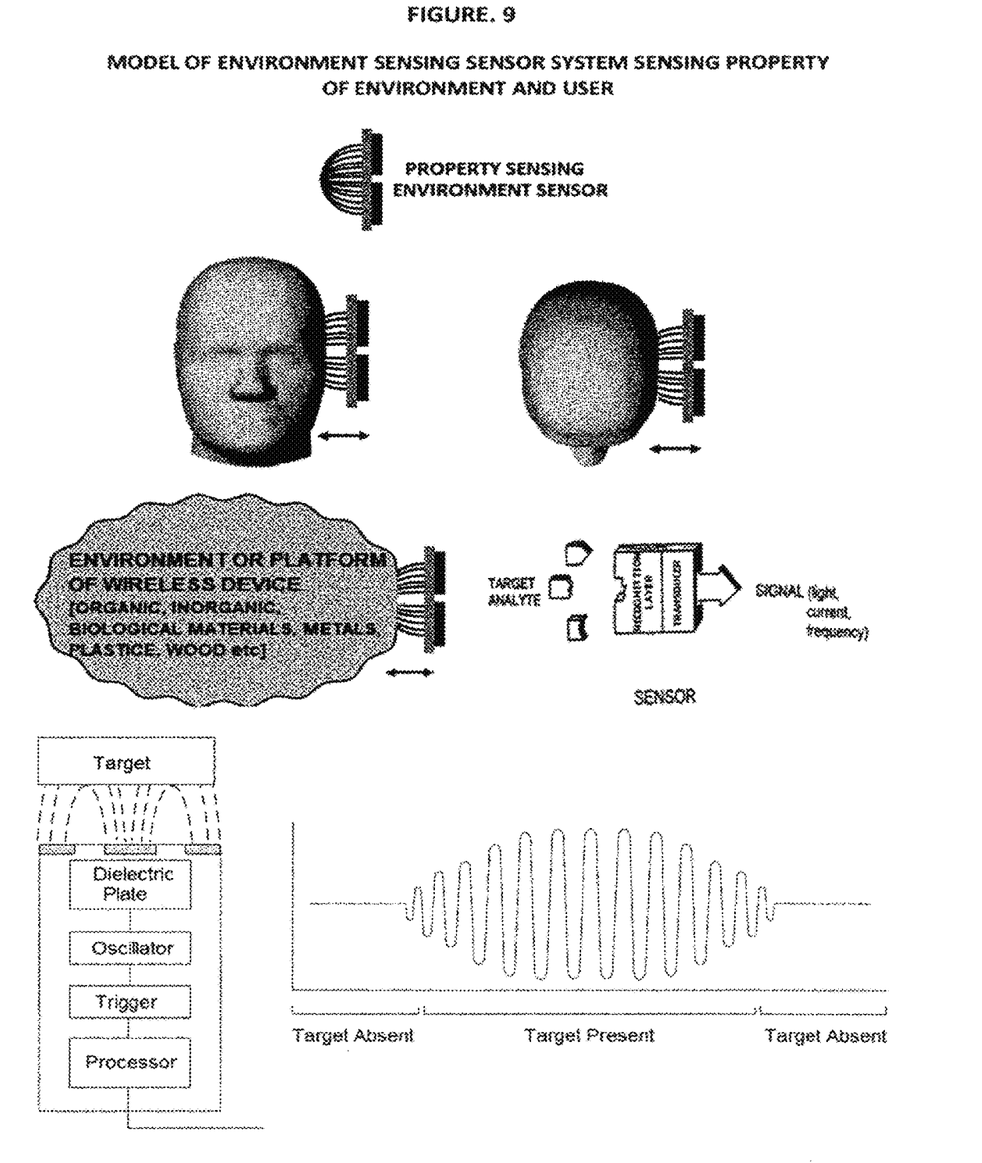
FIG. 9 illustrates the environment sensing sensor system sensing the property of the environment and users.

The primary aim of the present system is to provide mechanism for autonomous multi directional mobility and ability to change the orientations for the mobile devices all according to scenarios and ambient intelligence thereby ultimately to provide the mobile devices with precise and superior environmental exposure, precise user sensing, enhanced user interaction, better user display visibility. Before varying or changing the location and orientation of the mobile device, the present system checks the current and relative position, orientation, altitude, location, property of the proximity environment, nature of the platform for secure and optimally varying the mobility and orientation of the mobile device. The system also provides the exposure to mobile devices for learning of highly dynamic environment. The present system utilises neural networks and artificial intelligence for self-learning. The system also utilises the vibrator to provide the determined directional mobility with positioning systems. The present system utilises the fisheye lens and other appropriate lens with cameras and audio sensors [MIC], direction of audio to sense the environment. The present system also utilises the predetermined and tested table as a reference to check and compare with the real world scenarios thereby to accordingly provide the mobility and vary the orientation of the mobile device. The present system also reduces the need for taking the mobile device while providing the optimised user experience in user interaction and display visibility. The present system also utilises MEMS to provide the mobility to mobile devices. The present system also utilises hold mechanism to provide holding effect to platform or surface area of contact. AMORPM varies the orientation, location and position according to direction of sound.

Utilizing the present system mobile device can sense and act according to user's command—interact, mobilise, change the orientation, rotate the mobile device, looking at the user face for further interaction etc. The system utilises cameras and MIC's to precisely sense the mobile users relative direction thereby interact and act according to the users command. For instance, the present system works by utilising four variable legs and foot on the rear side of the mobile device with sensor systems that can change the orientation, rotation and location of the mobile device according to scenarios. The foot comprises of either one or combination of both sticky [rubber] and smooth [metal or plastics] and utilises vibrator to move the device in determined direction. The legs are driven by 4 servo or stepper motor to vary or change the length of the leg's accordingly to requirements. The system works in combination of relative motion, varying length of the legs, nature of the foot, orientation, change in load on legs, change in centre of gravity, vibrator's effect or action, environmental nature, property of the platform etc. The present system can be integrated with mobile phone projector which in turn provides convenience to the users from taking their mobile devices.

The AMORPM mechanism utilises following sensors to precisely sense the environment, change in environment and users status etc. The sensor for sensor system is selected from the group comprising of proximity sensors, distance & range sensor, optical sensors, visual & infrared sensors, 2D & 3D [dimension] sensors, orientation sensors, accelerometer, gyro sensor, directional sensors, E-compass or magnetometer, position & location sensor, temperature sensor, humidity & moisture sensor, ultrasonic sensors, altitude sensor, clip sensor, cradle or holster sensor.

The proximity sensors and sensor arrays capable of scanning, detecting, tracking and sensing the change in property [nature] of different proximity environments and various biological tissues, materials & bones with its direction, dimension, positions, multi layers & range with respect to device there by precisely sensing user head, body & handhold effects, effects of platform & environment. The parameters utilised for sensing comprise of permittivity-ε, permeability-μ, conductivity-σ, susceptibility, dielectric, capacitive sensing, capacitive displacement sensing, inductive sensing. The sensor system utilise one or more proximity sensors or sensor arrays optimally placed in various locations & positions according to device design for more precisely sensing in all possible directions. The proximity sensor are selected from electromagnetic sensors, electrostatic sensors, acoustic, inductive, thermal, echo, capacitive, infrared, eddy current, ambient light, active & passive sensors. Gyro sensor, accelerometer, inclinometer, E-Compass or magnetometer to sense the change in orientation and direction of the mobile device. The sensors utilised are selected with one to multi dimension and axis sensing capability.

One or more sensors or cameras with visual, infrared [thermos-graphic], ultrasonic and its combinations are optimally located in mobile device and ambient intelligent system according to the design for scanning & sensing the environment, user & objects presence, face & body recognition with autofocus, iris recognition, imaging, scanning & sensing in multi direction & dimension, computing distance [range] of user & other proximity environment with respect to mobile device. The infrared cameras utilised comprise of active infrared, passive infrared and its combinations. The system utilises 360 degree or omnidirectional sensors & cameras [visual & IR], popup cameras, front & rear cameras, side & corner cameras, 2D & 3D cameras with the lenses utilised comprising of regular camera lens, super ultra-wide angle lens, fisheye lens, extreme angle broadband metamaterial lenses, tuneable metamaterial lenses, super lenses, opto-fluidics lenses, tuneable lenses ultimately for scanning and detecting the environment in all possible direction. The system utilise active digital image processing and signal processing to sense the change in environment. According to design, configuration & scenarios the system utilise fisheye lens for sensing the change in environment and utilise other appropriate feasible lens cameras for further tracking of the humans & objects in environment.

Distance or range sensors and cameras are selected form the ultrasonic range sensor, infrared range sensor, electromagnetic range sensors, acoustic range sensor, visual range sensor, photo electric range sensor that are optimally located to sense the range of user and proximity environment with respect in all possible directions. Optimally located one or more thermos-graphic or IR sensors, temperature sensors, sensors detecting proximity environments property with multilayer sensing, ambient light sensors, electromagnetic sensors, orientation sensors, sensing usage scenarios and operating modes with predetermined & tested lookup tables are utilised to more precisely sense the proximity environment and mobile devices in user pockets & pouch with orientation. MIC and ambient light sensor to sense the change in sound and ambient light level on the environment.

Temperature, moisture and humidity sensors to sense the device environments temperature, moisture and humidity of the mobile device. The operating modes and usage scenarios of the mobile devices are taken into account prior to moving the device. Position & location systems are selected from GPS, AGPS, GLONASS, satellite based positioning system, Wi-Fi positioning system, cell sight positioning system, Bluetooth positioning, Hybrid positioning system to sense the location & position of the mobile devices. The sensor system utilising device display itself as proximity sensor and proximity sensor itself as range sensor.

The sensor system utilise sensors comprising of fixed and tuneable sensitivity & range are selected according to design and scenarios. The sensor systems precision levels, sensing depth of dimension and multi-layer sensing are utilised according to design & requirements.

As multiple parameters are taken into account for optimising the user interaction the AMORPM to make sure that the optimising is done by taking one or more parameters according to scenarios, communication system design and acting modes with ultimately prioritising & optimising between sensor systems to achieve optimised user interaction and save battery power.

The present system also assists in enhancing and maximising the wireless energy transfer through selecting optimised location, orientation, rotation. There are factors that affect how much power photovoltaic cell will generate. It is important to make sure that photovoltaic cells are placed in correct angle, right direction, orientation and optimal position to achieve maximum energy from photovoltaic cell. The ideal situation is when the light is hitting the panel at a perfectly perpendicularly angle [90 Degree] maximizes the amount of energy striking the photovoltaic cell and being produced. So the panels need to be directed according to this positioning to achieve maximum efficiency in wireless energy transfer. The present system with the potential of computing or determine and varying the mobile device's photovoltaic cell with correct angle, right direction, orientation and optimal position ultimately to achieve maximum energy transfer. Ambient intelligence based coherent energy power source network works in conjunction with present mobility system of mobile devices with photovoltaic cells actively communicate wirelessly in a closed loop manner for computing or determining and achieving the right angle, correct orientation and optimal position utilising predetermined and tested reference mapping table.

The present systems capability of varying angle, mobility, orientation and rotation system can be implemented in mobile devices, watches, wearable computing devices and other similar devices. The present system can even utilised for wireless energy transfer based on principle of induction or mutual coupling angle, position and orientation plays a vital role in achieving the maximum efficiency. The present mobility system can also be utilised as a module for modular phones, which in turn provides the mobility for existing mobile devices without upgrading directly to mobile devices with integrated potential of mobility. Also the present system can be implemented in mobile case, cover, pouch etc. where the case, pouch or cover with potential of changing the angle, orientation, position, location which ultimately provides the mobility to mobile devices. The mobile device and the case, cover, pouch etc. communicate with each other to achieve the optimal power transfer, user experience, environmental exposure for mobile devices. The present system also provides the autonomous ability to fly for the mobile devices. Autonomous mobility and flight mechanism may be either completely integrated [Non Modular] in the mobile device or standalone with detachable [Modular] provision for mobile devices. The flight mechanism may utilise principle of insect wings. The mobility and flight enhances the user interactive experience, wireless energy transfer efficiency Autonomous mobility and flight mechanism provided better efficiency in environmental exposure for mobile devices ultimately utilising for further processing. The present system could be utilised to various form factors of the mobile devices comprising of mobile cell phone, cordless phones, walky talkie, laptops, satellite phones, gaming devices, IP phones with form factor of the device selected form group consisting of bar, slate, flip, slider, swivel, flexible, watch, transparent, tablet or its combinations [mixed] type.

The embodiments of the present invention is not limited to listed scenarios described here or its combinations and the above presented are just examples. There may be other scenarios and those who skilled in field can understand and modify, enhance, alter the herein system without departing from the scope of the invention in its widest form.

The invention claimed is:

1. Autonomous Mobility, Orientation and Rotation Providing Mechanism for Mobile Devices (AMORPM) is a mechanism to provide an enhanced environmental exposure for a mobile device in sensing, reacting, alerting and proactively interacting with an environmental users and objects according to scenarios and critical situations comprising:
    a) a sensor system to generate a trigger signal by sensing a nature and property of the environment, platform or surface, operating modes and usage scenarios of mobile device;
    b) a processing unit that computes the a control signal for AMORPM mechanism based on
        the trigger signal from the sensor system;
        the sensor system precisely sensing the nature or property of environment;
        the sensor system performing visual and infrared sensing;
        the sensor system precisely sensing the dielectric property and nature of the environmental users and objects;
        the sensor system detecting the nature of the environment by precisely sensing the property of the user head, body and face recognition;
        an inputs from an operating modes and usage scenarios of mobile device;
        are all compared with a predetermined and tested correlation table parameters in an active, adoptive and closed loop manner for precisely computing the environments nature, feasibility and space for mobility, rotation and orientations;
    c) the AMORPM mechanism of the mobile device utilizes at least one of a automatically retractable motorised section telescopic legs that acts according to the control signal from the processing unit to change mobile devices orientation, rotation, mobility ultimately to provide enhanced environmental exposure and user interaction according to scenarios;
    d) alerting and interacting system coupled with the processing unit alerts and interacts with the users utilising a speaker, a voice alert/interaction, a microphone, a display and a lighting components to convey the message.

2. The AMORPM mechanism of mobile device said in claim 1, comprise of sensor system that works based on one or combination of sensors, operating modes and usage scenarios;
    a) one or more optical sensors or cameras with visual, infrared or thermo-graphic, ultrasonic and its combinations are optimally located in the mobile device according to the device design for scanning and sensing:
        the environment and its objects in multi direction and dimension;
        user presence;
        face, body and Iris recognition with autofocus;
        computing distance or range of user and other environmental objects
        with respect to device; the infrared cameras utilised comprise of active infrared sensors, passive infrared sensors and its combinations;
    b) the AMORPM utilises at least one
        fisheye lens cameras;
        360 degree or omnidirectional sensors, visual and Infrared (IR) cameras;
        popup cameras;
        existing front and rear cameras, side and corner cameras;
        2D and 3D sensor cameras
        with the lenses utilised comprising:
        regular camera lens;
        super ultra-wide angle lens;
        for scanning and detecting the environment in all possible direction;
    c) the AMORPM utilise at least one fisheye lens for sensing the change in environment and utilise other appropriate feasible lens cameras for further tracking of the users and objects in the environment;
    d) the property sensing sensor comprising:
        dielectric sensors;
        electromagnetic sensors;
        electrostatic sensors;
        acoustic sensors;
        inductive and capacitive sensors;
        temperature sensors;
        echo sensors;
        thermo-graphic or infrared sensors;
        eddy current sensors;
        ambient light sensors;
        ultrasonic sensors;
        belt pouch sensor, clip sensor, cradle or holster sensor;
        active and passive sensors;
    e) property sensing sensors senses parameters comprising:
        permittivity-$\varepsilon$;
        permeability-$\mu$;
        conductivity-$\sigma$;
        susceptibility;
        dielectric;
        biological tissues;
        inductive and capacitive sensing;
        capacitive displacement sensing;
        organic and inorganic property of device platform and environment;
        precisely sensing environmental users and objects with its property;
        dimension;
        direction;
        multi-layers;
        range or distance and position with respect to device;

visual and infrared sensing;
sensing mobile antenna's orientation, direction, location and attitude;
Mobile Sensing Platform (MSP);
ambient intelligence;
operating modes and usage scenarios of the device;
f) sensors for sensing change in mobile devices orientation, acceleration, altitude and direction comprising:
gyro sensor;
accelerometer;
inclinometer;
orientation sensors;
altitude sensors and
E-Compass or magnetometer;
g) distance or range sensors and cameras are selected from the
ultrasonic range sensors;
infrared range sensors;
electromagnetic range sensors;
acoustic range sensors;
visual range sensors and
photo electric range sensors
that are optimally located to sense the range of user and environment with respect to mobile device in all possible directions;
h) MIC and ambient light sensor to sense the change in sound and ambient light level on the environment of the mobile device;
i) temperature, moisture and humidity sensors to sense the environment of the mobile device;
j) the operating modes and usage scenarios comprising;
direct phone call mode;
speaker mode;
hands free mode;
headset detection;
video call mode;
Bluetooth mode;
detecting key pad and touch screen usage;
display orientation;
Wi-Fi mode;
internet access and browsing;
download mode;
games;
streaming;
standby mode;
sensing data transfer and wireless modem mode;
k) position and location systems are selected from
Global Positioning System (GPS);
Assisted Global Positioning System (AGPS);
Global Navigation Satellite System (GLONASS);
satellite based positioning system;
Wi-Fi positioning system;
cell sight positioning system;
Bluetooth positioning and
Hybrid positioning system
to sense the location and position of the mobile device;
l) as the property sensing sensor system has certain range limits and extending these range limits leads to complications like increase in size, complexity, power consumption etcetera, beyond which the AMORPM utilises visual and infrared sensors for scanning and sensing the environment.

3. The AMORPM mechanism of mobile device said in claim 1, comprise of processing unit that computes the control signal and their functions comprising:

a) control signal to automatically retractable motorised section telescopic legs for actively varying the mobility, orientation and rotation;
b) the processing unit utilises comparison table to check and compare with predetermined and tested real world scenarios with the actual real world scenarios and parameters to compute the control signal
c) the processing unit controls the sensor system by smartly toggling or switching between multiple feasible sensors and other associated sensors to obtain and continuously track the environmental parameters for further processing, in case if the parameters need to be obtained is out of scope of one sensor and turning off the out of scope sensors to optimize or save the battery power;
d) the processing unit utilise Digital Signal Processing (DSP) and Digital Image Processing (DIP) to compute the information from the sensors; the sensor system parameters are utilised by the processing unit aiding user recognition, face recognition, iris recognition and environment sensing with dimension and range.

4. The AMORPM mechanism of mobile device said in claim 1, where AMORPM mechanism comprising at least one:
automatically retractable motorised legs;
automatically retractable motorised telescopic legs;
automatically retractable motorised section telescopic legs;
motorised automatically kick stand;
vibrator;
driving mechanism;
smooth and sticky foot;
variable foot mechanism;
memory metal;
MEMS (Micro Electro Mechanical System)
all to provide the mobility, orientation and footing for the mobile devices.

5. The AMORPM mechanism for the mobile device said in claim 1, comprising of mapping tables, threshold level tables, correlation tables that are comparison tables which are utilised by the processing unit to actively check and compare the effects between predetermined and tested real world scenarios to the actual real world scenarios with which the AMORPM optimises the position, location and orientation accordingly in an adaptive closed loop manner and also for precisely sensing the user, various environments and usage scenarios;
a) the values in the tables are designed and developed by taking parameters comprising:
various property of environment comprising:
permittivity-$\epsilon$;
permeability-$\mu$;
conductivity-$\sigma$;
susceptibility;
dielectric;
organic;
inorganic;
user body band of dielectric values for sensing user;
capacitive sensing;
capacitive displacement sensing;
inductive sensing;
effect and range of environments;
sensing multilayer of environment;
sensing biological tissue;
sensing various locations and positions;
sensing user, head, body and handhold effects;
various signal quality parameters;

Signal to Noise and Interference Ratio (SNIR);
visual and thermo-graphic sensing;
effect of mobile device platform;
user body band of dielectric values;
user body band of infrared frequencies or wavelengths;
diffraction and diffraction limits;
effect of and effect on various environments;
operating modes and usage scenarios
are all tested at various real world scenario and frequencies are utilised by processing unit according to scenarios and design;
b) the above parameters and its values in the tables are utilised by the AMORPM to determine the
change in environment with its property and direction;
user sensing with band of user body dielectric values and IR frequencies;
conductive and dielectric nature;
location and position;
c) the processing unit utilise analysed, predetermined and tested threshold levels table designed and developed with different positions and orientations of the devices.

6. The AMORPM mechanism for the mobile devices said in claim 1, is utilised for guiding the mobile to select feasible and optimum location and position to achieve best signal quality and to save battery power;
 a) the processing unit utilise sensor system parameters, signal quality parameters, channel capacity, usage scenarios and operating modes for the computing and detecting the optimum location;
 b) the AMORPM mechanism assists the mobile device to reach optimum location, position and orientation for mobile devices.

7. The AMORPM mechanism for mobile devices said in claim 1, utilises the automatically retractable motorised section telescopic legs for varying mobility and orientation to interact and alert the users regarding the unattended parameters comprising of incoming calls, mails, messages, meetings, to do note, schedule task, alarms and critical situations by automatically sensing the user presence once the user is back to environment and within the scope of sensor system
 a) the AMORPM utilises one or more visual, thermal or infrared sensors and cameras to sense the user presence;
 b) the AMORPM works with existing front and rear cameras with all other optimally located feasible cameras and sensors ultimately to detect the user in all possible directions; the AMORPM utilises at least one fisheye lens for sensing the change in environment and utilise other appropriate feasible lens cameras for detecting and track the users in the environment;
 c) the AMORPM works irrespective of availability of light or zero light environment utilising correlation table with human body's band of infrared frequencies or wave lengths for sensing the user with thermal imaging; the AMORPM utilise active and passive infrared sensors or cameras for sensing the user;
 d) the AMORPM utilise DSP, DIP, MIC and ambient light sensor to enhance the precision in sensing the users on environment;
 e) the AMORPM works with preconfigured settings and user configured settings;
 f) the AMORPM utilise face recognition and iris recognition to alert the actual mobile user in case of multiple people exist in the environment and scope of sensor system;
 g) when the user is back the AMORPM alerts and interacts with the user through display, ring tone, vibrating and voice alert or message;
 h) the AMORPM comprise of provision for interacting with user and controlling through voice command, gesture and recognition that works with or without user taking the mobile device to check the information regarding unattended parameters and alerts and utilise voice control and gesture to control and interact with the device functions like phone call, message, text to speech and vice versa for message and mails; the mobile device interacts with the user through voice message, vibrations, ringtone, display and its combinations;
 i) the AMORPM also smartly turns off the out of scope cameras and sensors based on nature of trigger signal from property sensing sensors to save battery power.

8. The AMORPM mechanism of mobile device said in claim 1, utilises the automatically retractable motorised section telescopic legs for varying mobility and orientation to support the integrated projector to automatically provide optimum position and orientation for virtual display and virtual keyboard without the need for docking station.

9. The AMORPM mechanism of mobile device said in claim 1, utilises the automatically retractable motorised section telescopic legs for varying mobility and orientation thereby to assist wireless energy transfer through providing an optimum feasible location and position for mobile devices to recharge and achieve maximum energy transfer from wireless energy sources.

10. The AMORPM mechanism of mobile device said in claim 1, works utilising artificial intelligence and neural network for sensing and learning the usage scenarios to act accordingly.

11. The AMORPM mechanism of mobile device said in claim 1, where in the AMORPM works with devices comprising of mobile cell phone, cordless phones, walky-talkie, laptops, satellite phones, gaming devices, (Internet Protocol) IP phones with form factor of the device selected from group consisting of bar, slate, flip, slider, swivel, flexible, watch, transparent, tablet and mixed type.

* * * * *